Nov. 24, 1931.  J. MIYO  1,833,468

LANDING GEAR FOR AEROPLANES

Filed Nov. 13, 1930  3 Sheets-Sheet 1

JOSEPH MIYO,
INVENTOR

BY Julian Wittal
his ATTORNEY

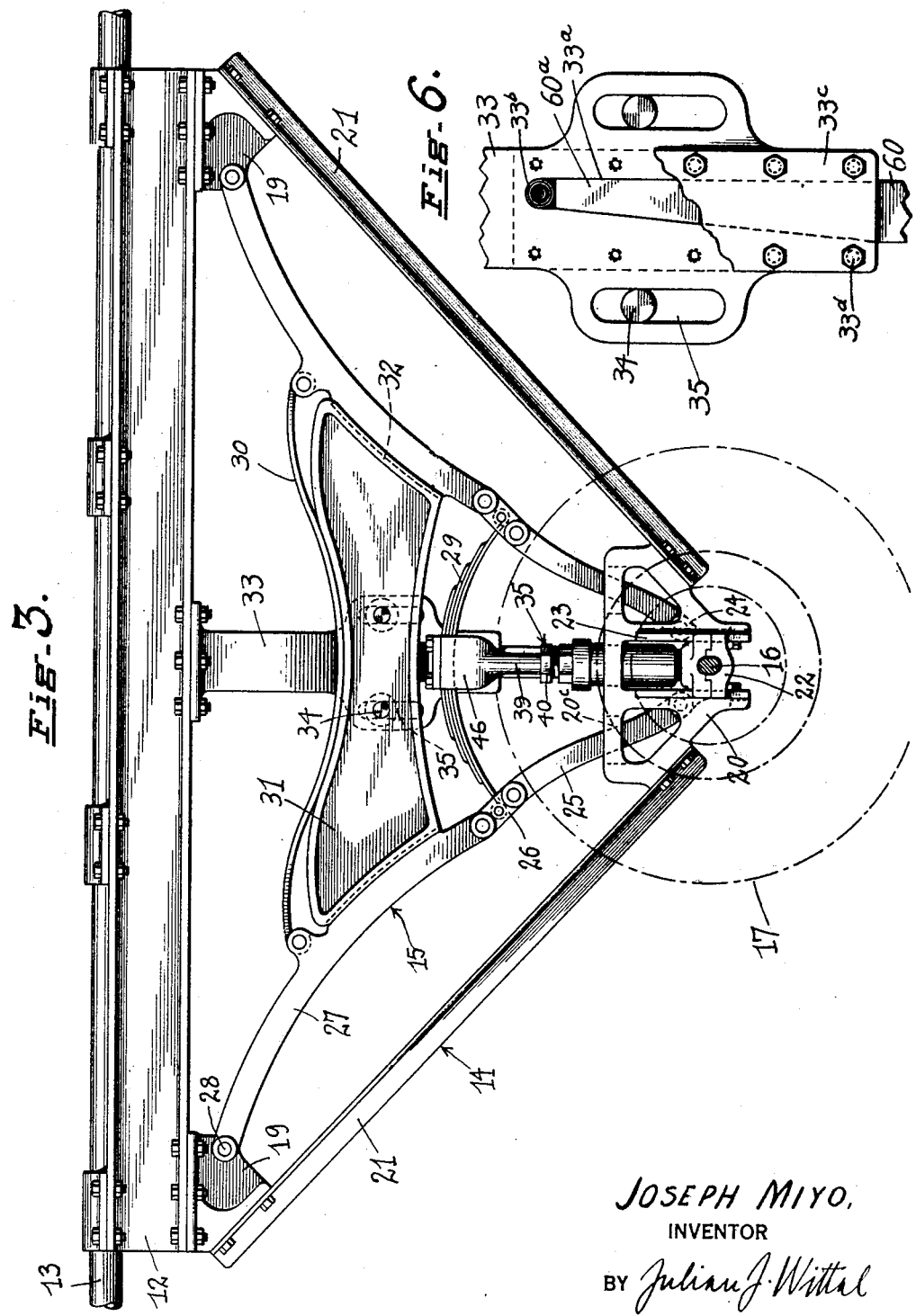

Nov. 24, 1931.  J. MIYO  1,833,468
LANDING GEAR FOR AEROPLANES
Filed Nov. 13, 1930   3 Sheets-Sheet 3
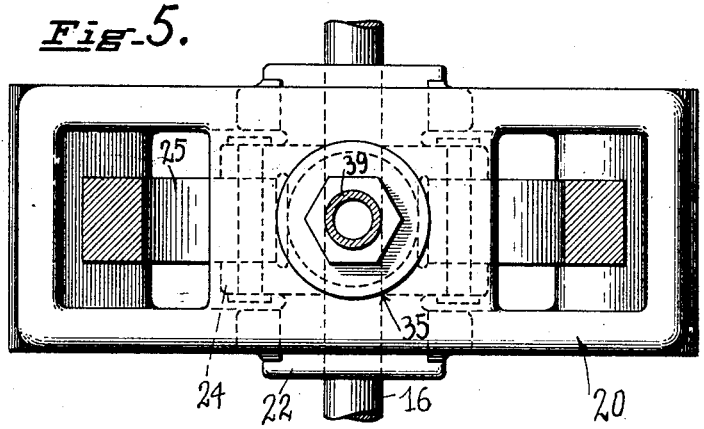
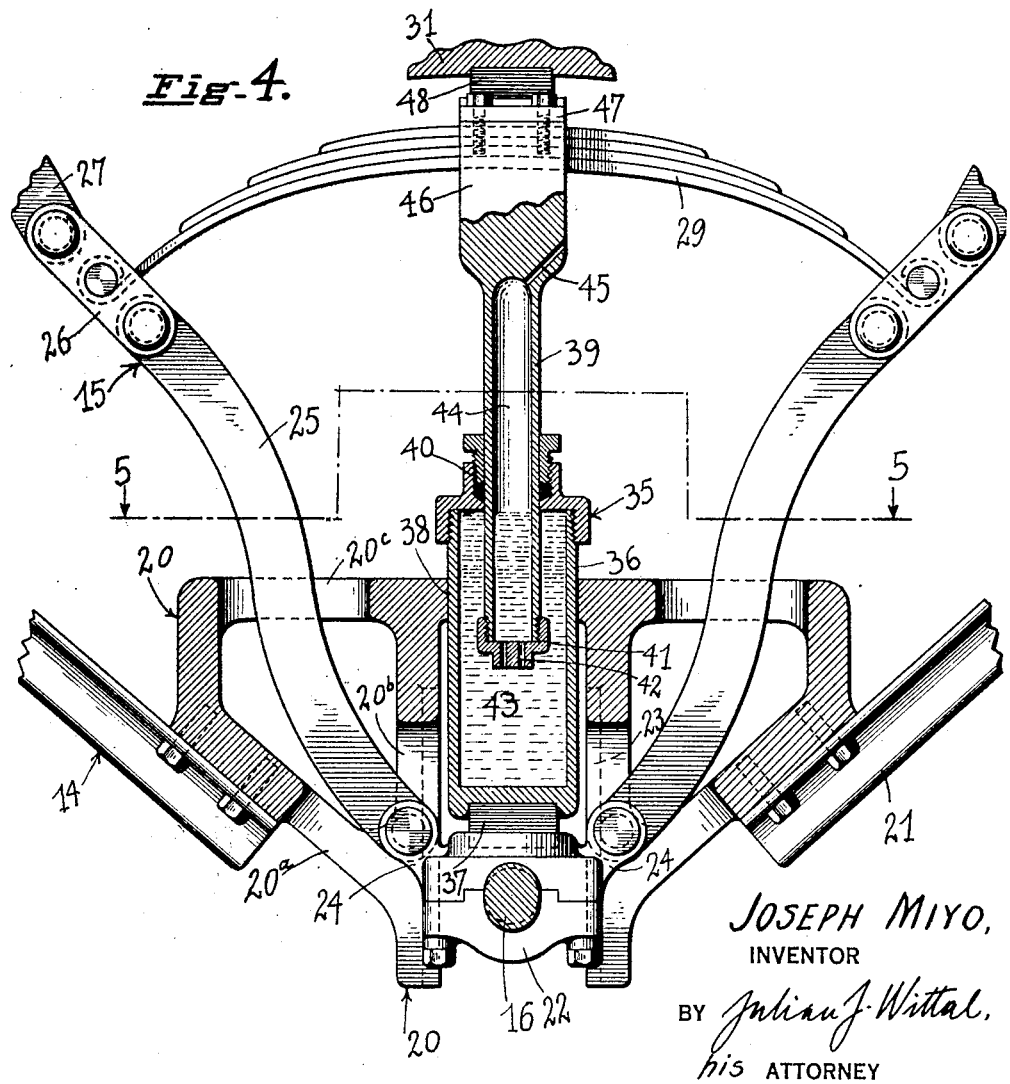
JOSEPH MIYO,
INVENTOR
BY Julian J. Wittal,
his ATTORNEY Patented Nov. 24, 1931

1,833,468

UNITED STATES PATENT OFFICE

JOSEPH MIYO, OF PERTH AMBOY, NEW JERSEY

LANDING GEAR FOR AEROPLANES

Application filed November 13, 1930. Serial No. 495,309.

This invention relates to landing gears for aeroplanes and has for its main object to provide a landing gear which will absorb shocks coming from various directions.

Another object of this invention is to provide a system or combination of resilient elements which are adapted to distribute the shocks coming from various directions when the aeroplane is landing, so that said shocks and similar violent exterior forces particularly accompanying a forced landing will be taken up gradually and will be finally checked in a gentle manner.

Still another object of this invention is to provide a device as characterized hereinbefore which will be adapted to be applied to present constructions of aeroplanes and to many other possible constructions thereof, in a simple and reliable manner and which will not depend on the style of the upper construction of the machine.

Still further objects of this invention will be apparent as the specification of the same proceeds, and among others are; to provide a landing gear for aircraft which will be simple and reliable in construction and operation and which will be adapted to absorb forces and shocks of great violence.

In the accompanying drawings forming a part of this specification:

Fig. 3 is a side elevation of my assembled landing gear as applied on an aeroplane.

Fig. 4 is a fragmentary sectional view of the lower part of my landing gear, while Fig. 5 is a cross sectional view thereof, the section being taken on the line 5—5 of Fig. 4;

Fig. 6 is a fragmentary detail showing the lower part of a down hanging casting in which the side and the transverse shock absorbing resilient elements are guided and their motion limited.

Figure 1:
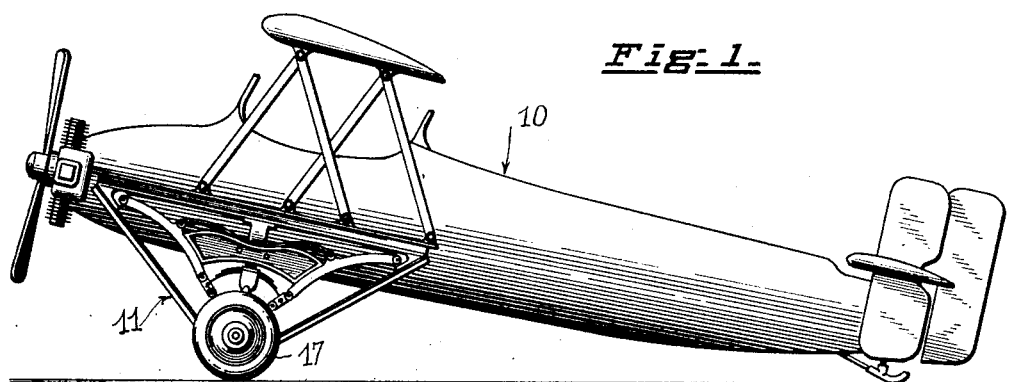
Fig. 1 is a side elevation of an aeroplane to which my landing gear has been applied.

Referring now to the drawings in detail, by characters of reference, the numeral 10 indicates an aeroplane in general and of the usual construction on which my landing gear, designated in general by the numeral 11, has been applied.

My landing gear is secured to two longitudinal side beams 12 secured on any appropriate part of the frame structure of the aeroplane, as on the tubes 13.

Figure 2:
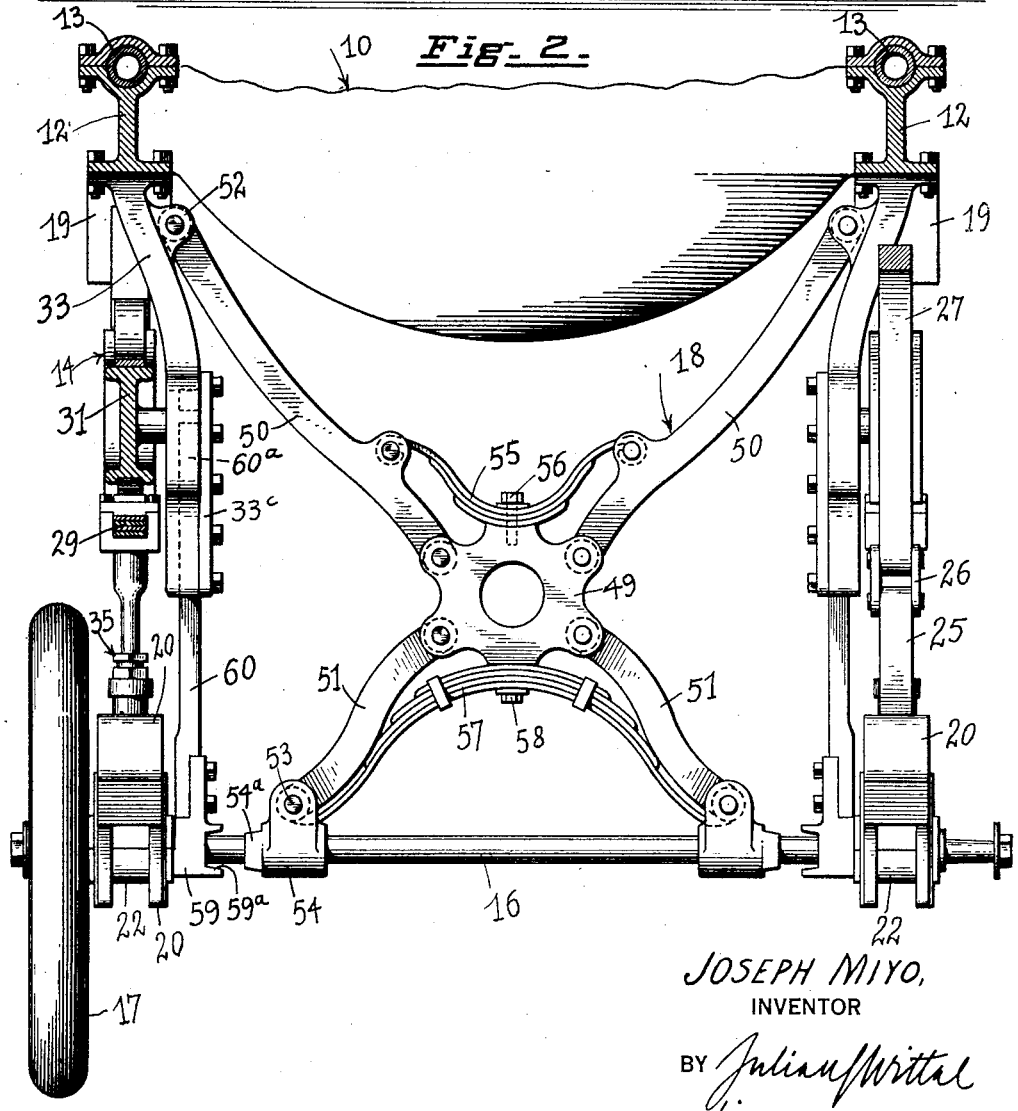
Fig. 2 is a central transverse sectional elevation of my landing gear, showing the transverse resilient shock absorbing device thereof in elevation.

A frame structure, generally indicated by the numeral 14, is secured on each beam 12 to receive the two said lengthwise shock absorber structures generally indicated by the numeral 15, and carrying the axle 16 of the aeroplane with the wheels 17 thereon, while a transverse central shock absorbing structure, generally indicated by the numeral 18, is further secured crosswise between said two beams 12 and the axle 16 (Fig. 2).

The frame structure 14 receiving the lengthwise shock absorbing structure 15 is composed of two castings 19 secured at the two ends of the beams 12, and a lower casting 20, the three castings being secured together by the T or angle irons, or other structure or elements 21 to form one rigid triangular frame.

The respective end of the axle 16 is secured in a bearing 22 slidable in appropriate guides 23 in the lower casting 20. Said bearing 22 has two ears 24 to which are pivotally secured the lower link elements 25 which are continued in small connecting or middle link elements 26 and the chain of said link elements is ended by upper link elements 27 pivotally secured in the castings 19 as at 28. The lower casting 20 has cut out portions 20a, 20b, and 20c to permit a free play of the ears 24 and of the lower portion of the link element 25. Two appropriately curved flat or leaf springs 29 and 30 are secured crosswise between the smaller middle link elements and the upper link elements 27 respectively, interconnecting the said two pairs of link members. A plate casting 31 is placed between the two springs, its right and left ends resting on the lower parts of the upper link members 27 and are slidable thereon by a slot and feather construction as indicated at 32. A somewhat inwardly bent downhanging casting 33 is further secured in the middle of each beam 12 and said plates 31 may be further secured and guided by projecting pins 34 thereof playing in slots 35 of said down hanging casting 33.

A yielding oil device or dash pot indicated in general by the numeral 35 may further be interposed between the sliding bearing 22 and the springs 29, said oil dash pot may consist of a closed cylinder 36 which may rest on the top of the bearing 22 preferably having a resilient rubber pad 37 interposed between the two and being slidable in the casting 20 as at 38. A hollow piston or plunger 39 may play in the cylinder 36 through the stuffing box 40, said cylinder being normally filled with oil. The lower end of the plunger may be closed by a screw threaded cover 41 showing the small communicating apertures 42 between the spaces 43 in the cylinder and 44 in the plunger. A bleed hole 45 is further provided to permit exit or ingress of the air from or into the space 44. The upper end 46 of the plunger may be forked receiving the central part of the leaf spring 29 between the branches of this fork and having a cover 47 to secure said spring thereon. The plate 31 finally may also rest with its lower edge on the top of said plunger 39 having a resilient rubber pad 48 interposed between the two.

The transverse reenforcing and shock absorbing structure 18 of my device may preferably consist of a central plate or casting 49 into the four corners of which are pivotally secured the upper transverse link members 50 and the lower transverse link elements 51, respectively, the upper ends of the upper link elements 50 are pivoted on the casting 33 as at 52, while the lower ends 53 of the lower link elements 51 are pivoted in two hubs or sleeves 54 slidable on the axle 16.

An upper leaf spring 55 is secured between the upper link members 50, being also secured to the central casting 49 as at 56, while a lower leaf spring 57 may be secured to the lower part of said casting as at 58 and to the lower ends 53 of the lower link members 51.

Adjacent to the outer ends of the axle 16 and to the bearing 22 thereon may be further secured to said axle in a permanent manner two castings 59 carrying the upstanding arms 60. The upper ends 60a (Fig. 6) of said upstanding arms being preferably wedge shape and adapted to play in similarly shaped guide slots 33a in the lower ends of the downhanging castings 33.

The operation of my device is as follows:

Upon the landing of an aeroplane, a more or less violent shock or reaction force will be exerted on the wheels 17 and being transmitted from them to the axle 16 which is secured in its bearings 22 in a non-rotatable manner as by making the respective portion thereof oval in cross-section instead of being round (Figs. 3 and 4). The shocks or other outside force acting in the longitudinal planes of the machine will be taken up by the longitudinal resilient yielding and shock absorbing mechanisms at the two ends of the axle, which were generally indicated by the numeral 15. When such outside forces or shocks are acting on the axle 16 the bearing 22 will slide in an upward direction in the guides 23 of the casting 20 which movement is counteracted by the change in the link mechanism forming a part of said device 15 and the flat springs connecting the members of said link mechanism. Said shocks will also be gradually absorbed by the oil dashpot 35 as will be obvious by inspecting Fig. 4. The upward movement of the bearing 22 will be transmitted through the resilient rubber pad 37 to the cylinder 36 which may only move upwardly after part of the oil in the space 43 is pressed into the space 44 through the apertures 42, the bleed hole 45 permitting the air to escape from said space 44. This oil dash-pot will naturally take up part of the forces acting on the axle and will also transmit the rest to the leaf spring 29 through the head 46 of the piston 39 and also to the plate casting 31 through the intermediacy of the rubber pad 48 and finally to the flat spring 30. All this will cause a multiple distribution and a very gradual diminution of the outside forces.

The forces and shocks acting in the transverse plane of the machine will be taken up by the transverse central resilient mechanism 18 in a manner which will be obvious by inspecting Fig. 2. Upon the moving of the axle 16 in an upward direction in relation to said mechanism, the sleeve 54 will have to slide in an outward direction on the axle 16. To limit this sliding movement of said sleeves the permanent members 59 are secured on the axle 16 having a conical receiving socket or opening 59a which is adapted to cooperate with the conical extension 54a on the sleeve 54 and thereby efficiently stop the further outward movement of the sleeve 54. The resilient device 18 is now locked on the axle and any further possible upward movement of said axle will be limited and terminated by the upper wedge end 60a of the upstanding arm sliding in its guide slot 33a in the downhanging casting 33. Before the wedge shaped end 60a of said arm is permanently locked into slot 33a it may strike a resilient rubber cylinder 33b secured into the casting 33 at about the end of the travel of said arm 60, so that the last possible remaining shock may be absorbed thereby. When the part 60a is driven home in the slot 33a all further upward movement of the axle will be prevented. The part 60a may also serve to guide the movement of the axle 16 and the lower part of the casting 33 may have a cover plate 33c secured thereon as by the screws 33d to aid in the movement of the part 60a and to keep the same in place.

It will be obvious that in case an uneven or one sided shock or outside force acts on the machine in either direction the described link mechanisms and springs will be adapted to resistingly yield in the necessary direction, take up the said shock or outside force and then right the machine by their resilient motion.

It will be understood that changes and variations may be made in the parts and combinations of my device and I hereby reserve all my rights to any and all such changes and modifications as are within the spirit of the invention and the scope of the appended claims.

What I claim as new, is:

1. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, and cross spring members connecting opposite pairs of elements in said chains of link members, and a spacing member between two oppositely placed link elements resting slidably thereon.

2. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, and cross spring members connecting opposite pairs of elements in said chains of link members, and a spacing member between two oppositely placed link elements resting slidably thereon, said spring members including two curved leaf springs above and below said spacing member, respectively, and being adapted to be engaged thereby.

3. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, and cross spring members connecting opposite pairs of elements in said chains of link members, and a spacing member between two oppositely placed link elements resting slidably thereon, a down hanging fixed member on the supporting structure of the aircraft, and means to guide said spacing member in said fixed member.

4. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, and cross spring members connecting opposite pairs of elements in said chains of link members, and an oil dash-pot device between said sliding bearing member and a cross spring.

5. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, and cross spring members connecting opposite pairs of elements in said chains of link members, and an oil dash-pot device between said sliding bearing member and a cross spring, said dash pot comprising a closed oil filled cylinder slidable in a part of the frame; a hollow piston working in said cylinder, having oil holes to connect the spaces in them and a bleed hole for the air within said piston and means to secure the upper end of the piston to a cross spring.

6. In a landing gear for aircraft having an axle and running wheels thereon, two longitudinal frame structures on the two sides of the machine, each frame structure having an axle bearing member slidably arranged therein; two chains of pivoted link members in each of said frames on the two sides of said bearing member, their ends being secured on the said bearing member and the supporting structure of the aircraft, cross spring members connecting opposite pairs of elements in said chains of link members, an oil dash-pot device between said sliding bearing member and a cross spring, a sliding spacing member between a pair of opposite link members, said sliding spacing member resting on a movable resisting piston of the dash pot device.

7. In a landing gear for aircraft, a transverse shock-absorbing device, consisting of a central plate; two upper pivoted link members to connect said plate to the two sides of the frame of the machine; two lower pivoted link members connecting said plate to two slidable sleeves on an axle of the landing wheels; springs interconnecting said respective pairs of link members, and stop members adjacent to the ends of the axle to limit the motion of said sliding sleeves.

8. In a landing gear for aircraft, yielding resilient devices between the axle of the running wheels and the frame of the aircraft; an upstanding member secured adjacent to each end of the axle; a down hanging member secured on each side of the frame of the aircraft, the upper end of each of said upstanding members slidably fitting into a slot on the respective down hanging member.

9. In a landing gear for aircraft as set forth in claim 8, a resilient stop member for the upper end of said upstanding member at the upper end of said slot in the path of the travel of said upstanding member.

10. In a landing gear as set forth in claim 8, said upstanding members and said slots being of cooperative wedge formation to provide a final stop for the travel of said upstanding members.

Signed at New York, in the county of New York, and State of New York, this 11th day of November, 1930.

JOSEPH MIYO.